United States Patent [19]

Wills

[11] Patent Number: 5,285,942
[45] Date of Patent: Feb. 15, 1994

[54] SKI CARRIER

[76] Inventor: James H. Wills, 12170 Ivywood St. NW., Coon Rapids, Minn. 55433

[21] Appl. No.: 862,804

[22] Filed: Apr. 3, 1992

[51] Int. Cl.$^5$ .................................................. B60R 9/00
[52] U.S. Cl. ........................................ 224/328; 224/309;
224/917; 220/4.022; 220/306
[58] Field of Search ............... 224/315, 328, 917, 308;
206/315.1, 443, 315.2, 315.1, 315.3, 315.4;
220/4.22, 306, 8, 503; 190/103, 104, 105, 19, 20

[56] References Cited

U.S. PATENT DOCUMENTS

| | | | |
|---|---|---|---|
| 2,475,961 | 7/1949 | Hilbert | 190/105 |
| 3,521,810 | 7/1970 | Boyer | 220/8 |
| 3,744,687 | 7/1973 | Oreck | 220/8 |
| 3,767,036 | 10/1973 | McLeod | 206/16 |
| 3,837,548 | 9/1974 | Nerger | 224/455 |
| 3,909,031 | 9/1975 | Schmardeke et al. | 280/11 |
| 3,921,871 | 11/1975 | Heil | 224/45 |
| 4,071,176 | 1/1978 | Tuomo | 224/42 |
| 4,084,735 | 4/1978 | Kappas | 224/42 |
| 4,161,268 | 7/1979 | Heil | 224/45 |
| 4,171,759 | 10/1979 | Wnek | 224/45 |
| 4,238,063 | 12/1980 | O'Dair | 224/45 |
| 4,402,355 | 9/1983 | Wymore et al. | 150/52 |
| 4,509,656 | 4/1985 | Rösler | 220/8 |
| 4,643,302 | 2/1987 | Baumgardner | 207/315 |
| 4,860,935 | 8/1989 | Paylinsky | 224/202 |
| 4,867,307 | 9/1989 | Bovee | 206/315 |
| 4,867,361 | 9/1989 | Burnham | 224/328 |
| 4,953,773 | 9/1990 | Wirth | 224/328 |

Primary Examiner—Henry J. Recla
Assistant Examiner—David J. Walczak
Attorney, Agent, or Firm—Kinney & Lange

[57] ABSTRACT

A ski carrier for alternatively transporting skis by manual carrying by a vehicle mounting the ski carrier therein, or by a common carrier. The ski carrier has a case having a cover portion and a holder portion, and an end cap positionable over an opening in the first end of the case when the cover and holder portions thereof are closed.

16 Claims, 6 Drawing Sheets

SKI CARRIER

BACKGROUND OF THE INVENTION

The present invention concerns ski carriers and, more particularly, a ski carrier that can be alternatively transported manually and by vehicle through mounting thereon.

To enjoy a day of skiing, most skiers must travel to a skiing facility and must transport their skis from their home or lodging to the skiing facility. Many skiers travel to the skiing facility by automobile and must therefore have a ski carrier capable of carrying skis on the automobile. Once at the skiing facility, parking is often a substantial distance from the ski slopes. Therefore, there is a need for a ski carrier that permits the manual carrying of skis from the automobile to the slopes. In addition, automobile travel to a skiing facility is often preceded by an airplane flight which imposes varied demands on a ski carrier both for carrying and as baggage.

A number of types of vehicle-mounted ski carriers are available for transporting skis. In addition, a number of types of ski carriers are available for manually transporting skis. However, a ski carrier convenient for vehicle-mounting is often inconvenient as a manual ski carrier.

A typical ski carrier is shown in U.S. Pat. No. 4,171,759 to Wnek. This ski carrier, as with many other vehicle-mounted ski carriers, requires a relatively permanently mounted bracket on the vehicle. Vacationing skiers, not uncommonly, rent an automobile on which they wish to carry skis. Therefore, having a ski carrier which can be mounted on an automobile without the use of any complicated or relatively permanent additional mounting devices is much desired.

Many vehicle mounted ski carriers expose skis to rain, wind, salt and object impacts due to following cars, causing damage to the skis. Hence, there is a substantial advantage in having a ski carrier that completely encloses and thus protects the skis. Particularly of further advantage, enclosing with a relatively rigid structure obviates the need to individually wrap skis to prevent edge damage during baggage handling during the course of airplane travel. Also, a ski carrier should be designed such that it cannot open accidentally, resulting in a pile of skis and poles on the ground or, worse yet, on the road. Further, the carrier should be lockable to secure the skis to a significant extent against theft.

SUMMARY OF THE INVENTION

The present invention provides a ski carrier for alternatively transporting skis either by manual carrying, or by vehicle through mounting of the ski carrier thereon, or by a common carrier. The ski carrier comprises a case having a cover portion and a holder portion, an end cap positionable over an opening in the first end of the case when the cover and holder portions thereof are closed, and two strap assemblies permitting the mounting of the ski carrier on a vehicle.

The cover and holder portions of the case can be attached at a side of each so that the case can conveniently be placed in either an open or a closed position to permit putting skis therein when the case is in the open position and at least partially enclosing the skis when the case is in the closed position. The holder portion of the case can have two cross-case brackets mounted therein for holding skis inside the case. When in the closed position, the case has the general shape of an elongated container having an opening at the first end thereof.

The end cap also has the general shape of a somewhat elongated container having a larger opening at one end thereof. If the case is in the closed position, the end cap can be slid over the first end of the case to prevent any significant opening of the case cover and holder portions from the closed position. A plurality of parallel ridges on the cover and holder portions of the case are received by a plurality of elongated recesses in the end cap in a detent-like arrangement to aid in holding the end cap in place aligned with the case. The end cap can be secured by a bolt insertable through a pair of holes in the end cap and through a selected matching one of a plurality of locking holes in the case.

The cover and holder portions of the case each have a first side having corresponding handle portions that protrude therefrom. When the case is in the closed position, the two handle portions together form a complete handle which can be used in manually transporting the ski carrier.

Each strap assembly comprises a strap arrangement having a pair of ends each of which can be inserted into, to thereby extend through, a corresponding one of the openings on either side of the holder portion of the case opposite one another. The strap arrangement also has a pair of hooks, one on each of these ends for hooking these ends onto either side of a vehicle. The strap arrangement further has a tightening buckle for tightening the strap arrangement to place it under tension if the hooks are engaged with the vehicle to secure the hooks to the vehicle. Thus, no additional mounting device is required for mounting the ski carrier on a vehicle.

The holder portion of the case and the end cap each can have a plurality of protruding supports molded therein. A bottom surface of these supports, or an appropriate pad thereon, comes into contact with the vehicle if the ski carrier is mounted thereon.

DETAILED DESCRIPTION OF THE PREFERRED EMBODIMENTS

Figure 1:
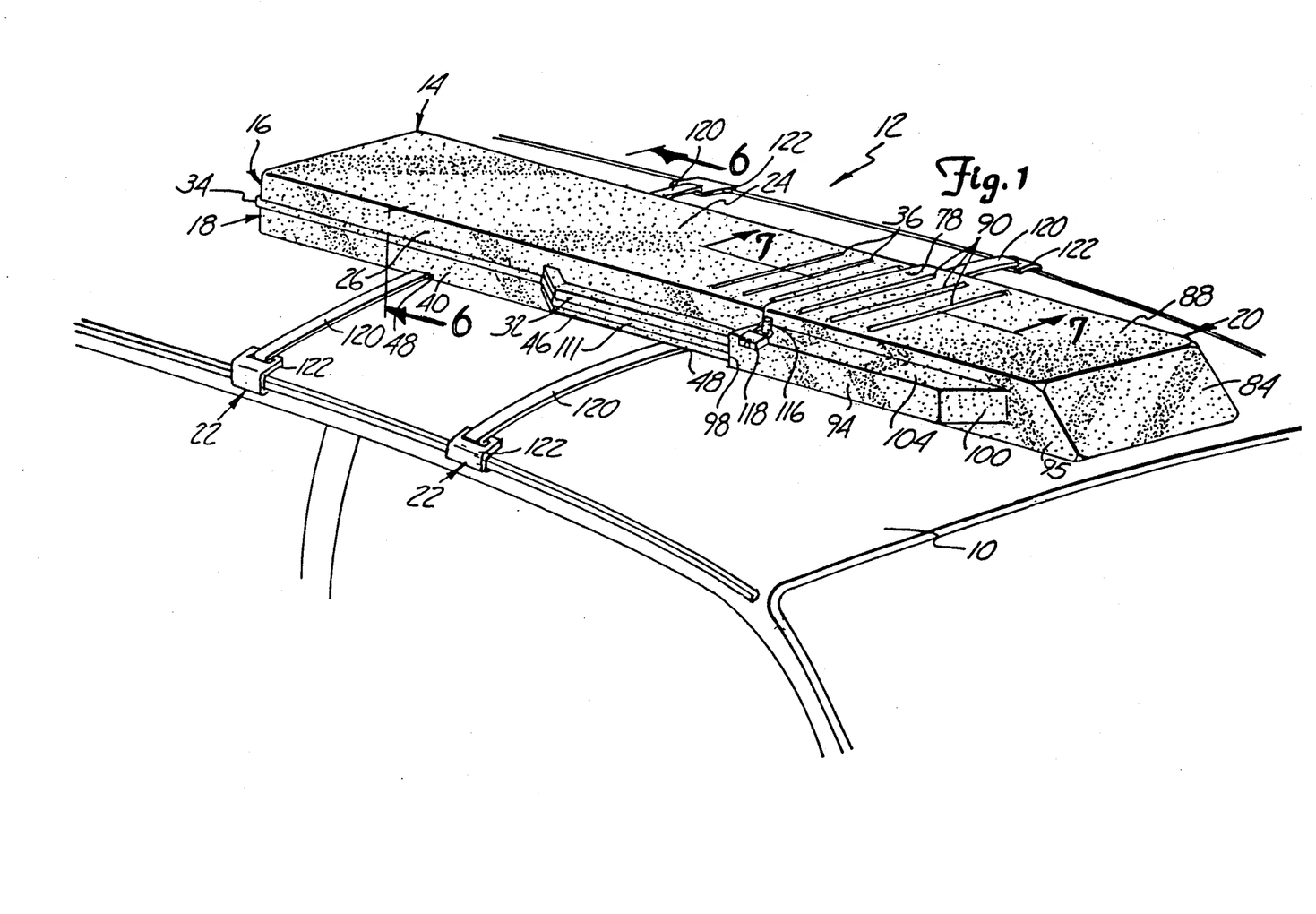
FIG. 1 shows a perspective view of the assembled ski carrier of the present invention mounted on a vehicle.

A vehicle, 10, having a ski carrier, 12, of the present invention mounted thereon is shown in FIG. 1. Ski carrier 12 comprises a case, 14, having a cover portion, 16, and a holder portion, 18, an end cap, 20, and two strap assemblies, 22. Cover portion 16, holder portion 18, and end cap 20 are each fabricated from a suitable molded polymer.

Figure 5:
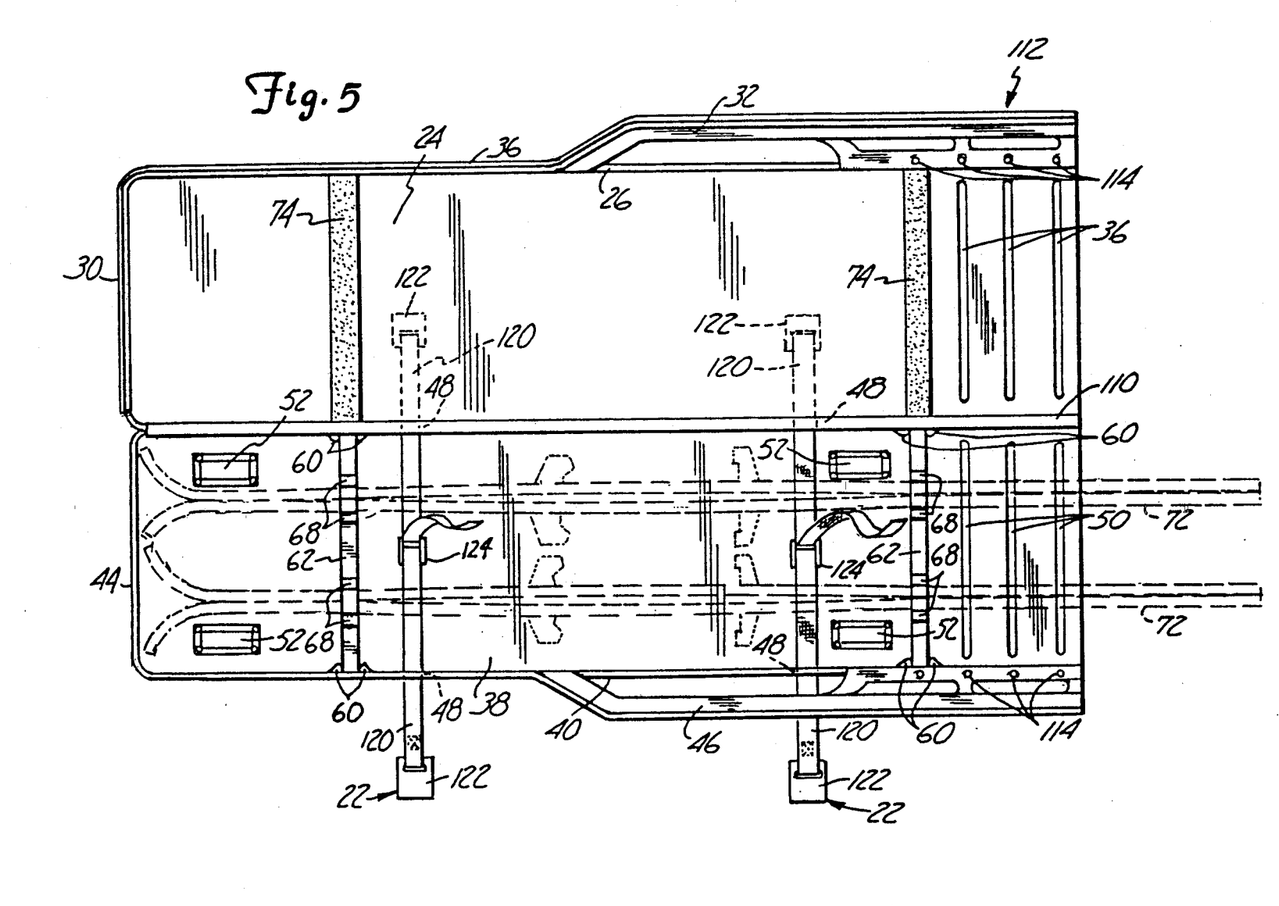
FIG. 5 shows a top view of the case portion of the present invention in the open position.

Cover portion 16 and holder portion 18 of case 14 are shown attached to one another lying side by side in FIG. 5. Cover portion 16 of case 14 has the general shape of an elongated half container having a generally rectangular cover major wall, 24, a first side, 26, a second side, 28, and an end, 30. A handle portion, 32, protrudes from and extends along first side 26. Cover portion 16 also has a lip, 34, which extends beyond the edges of first side 26, end 30, and handle portion 32. No end is provided across cover major wall 24 opposite end 30, leaving an open end in cover portion 16. A plurality of outwardly protruding, equally spaced, elongated parallel ridges, 36, are molded into cover major wall 24, such that there are recesses in the inner surface thereof, and extend perpendicular to both first side 26 and second side 28.

Holder portion 18 of case 14 is substantially the same size as cover portion 16 and also has the general shape of an elongated half container having a generally rectangular holder major wall, 38, a first side, 40, a second side, 42, and an end, 44. No end is provided across holder major wall 38 opposite end 44, leaving an open end in holder portion 18. A handle portion, 46, protrudes from and extends along first side 40. First side 40 and second side 42 of holder portion 18 each have two openings, 48, therein located such that those openings 48 in first side 40 are located directly opposite those openings 48 in second side 42. A plurality of outwardly protruding, equally spaced, elongated parallel ridges, 50, are molded into holder major wall 38, such that there are recesses in the inner surface thereof, and extend perpendicular to both first side 40 and second side 42.

A plurality of outwardly protruding, generally rectangular supports, 52, are molded into holder major wall 38. Supports 52 are seen from the top in FIG. 5, but are better seen in FIG. 6. Each support 52 has a pad, 54, attached to an outer surface, 56, of support 52, and has a hole, 58, to permit liquid, such as melted snow, to drain from holder portion 18 of case 14.

Four pairs of holder bracket ridges, 60, protrude inwardly from holder portion 18 with two pairs protruding from each of first side 40 and second side 42. All holder bracket ridges 60 are substantially perpendicular to holder major wall 38 in direction of extent, i.e. vertically oriented in FIG. 6. Members of each pair of holder bracket ridges 60 are spaced apart from one another. Two metal brackets, 62, are inserted in holder portion 18, each end of each bracket 62 being positioned in one of the spaces between a corresponding pair of holder bracket ridges 60. A straight side, 64, of each bracket 62 is in or near contact with holder major wall 38, a first side, 66, of each bracket is positioned between a pair of holder bracket ridges 60 protruding inward from first side 40, and a second side, 67, of each bracket is positioned between an opposing pair of holder bracket ridges 60 protruding inward from second side 42.

Figure 6:
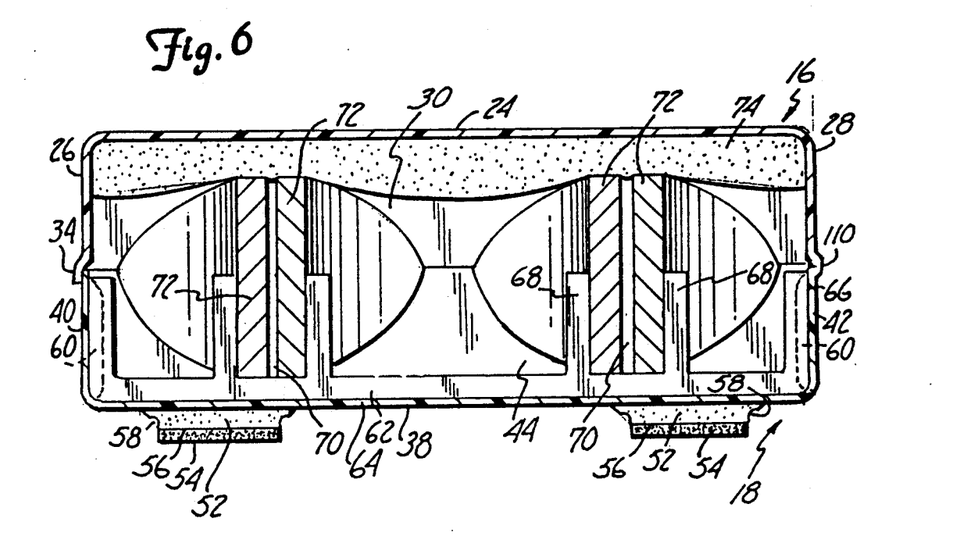
FIG. 6 shows a sectional view of the case portion taken along the line 6—6 of FIG. 1.

Each bracket 62 has two pairs of upward extending, spaced apart columns, 68, having rectangular cross sections. Each pair of columns 68 forms between them a slot, 70, in which a pair of skis, 72, may be inserted. Columns 68 secure skis 72 between them to tend to prevent them from slapping against one another, or sliding back and forth in contact with one another, to result in scratching of ski surfaces. Also, ski poles may be wedged between columns 68 and skis 72 for transport in case 14. Two foam strips, 74, are attached to cover major wall 24, with each strip 74 positioned in cover portion 16 such that it is directly opposite each bracket 62 in holder portion 18 if cover portion 16 and holder portion 18 are closed against one another as shown in FIGS. 1 and 6.

Figure 4:
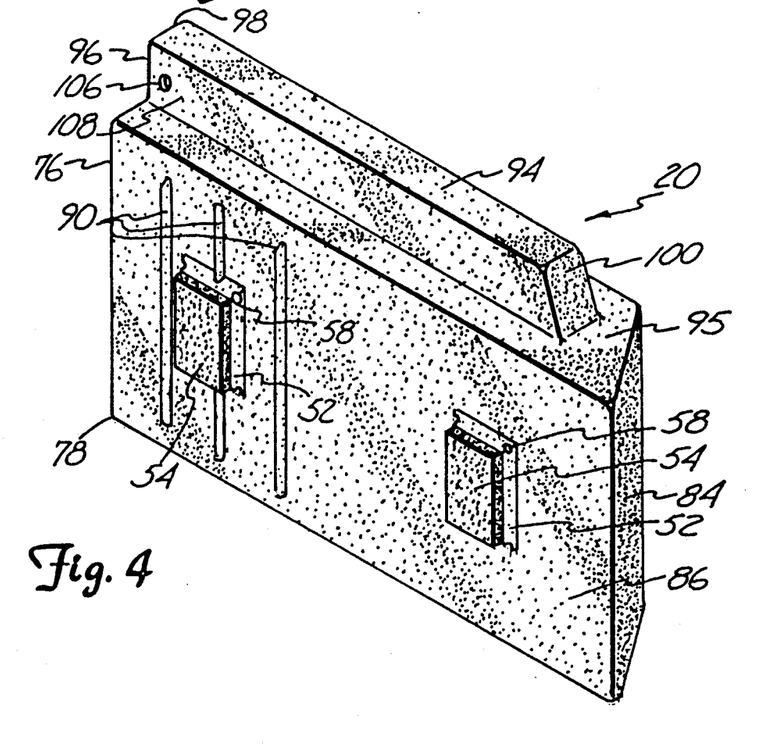
FIG. 4 shows a perspective view of the end cap portion of the present invention.

End cap 20 is shown separately in FIG. 4 rather than as assembled with case 14 as in FIG. 1 and has the general shape of a somewhat elongated container having an end opening, 76, in a first end 78. A second end, 84, of end cap 20 is acutely angled with respect to a cap support major wall, 86, shown in FIG. 4, and obtusely angled with respect to an opposite cap containment major wall, 88, shown in FIG. 1, to minimize the air resistance of ski carrier 12 encountered in facing forward on a moving vehicle. Two supports 52 are molded into cap support major wall 86. Each support 52 has a pad 54 attached to its outer surface 56 and has an opening 58 that permits liquid in end cap 20 to be drained.

Figure 7:
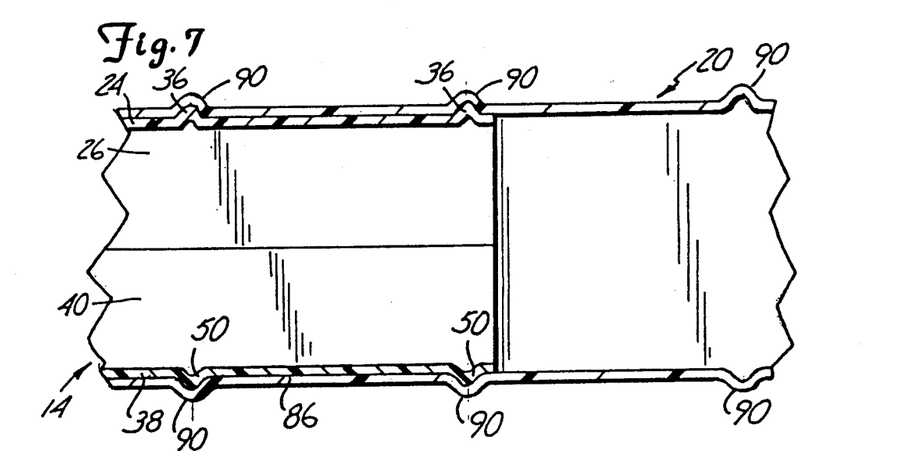
FIG. 7 shows a sectional view of a part of both the case and the end cap portions of the ski carrier taken along the line 7—7 of FIG. 1.

End cap 20 is shown with case 14 inserted therein in FIG. 7. Both cap containment major wall 88 and cap support major wall 86 have a plurality of outwardly protruding, equally spaced, elongated parallel ridges, 90, molded therein such that there are recesses, 92, in the inner surfaces thereof. Each recess 92 in one of these inner surfaces is directly across from a recess 92 in the other inner surface. Each recess 92 has a shape that permits one of ridges 36 in cover portion 16 and an opposite one of ridges 50 in holder portion 18 to be nestled therein with end cap 20 slid over the open ends of cover and holder portions 16 and 18 of case 14 so as to tend to keep end cap 20 aligned with case 14.

Figure 3:
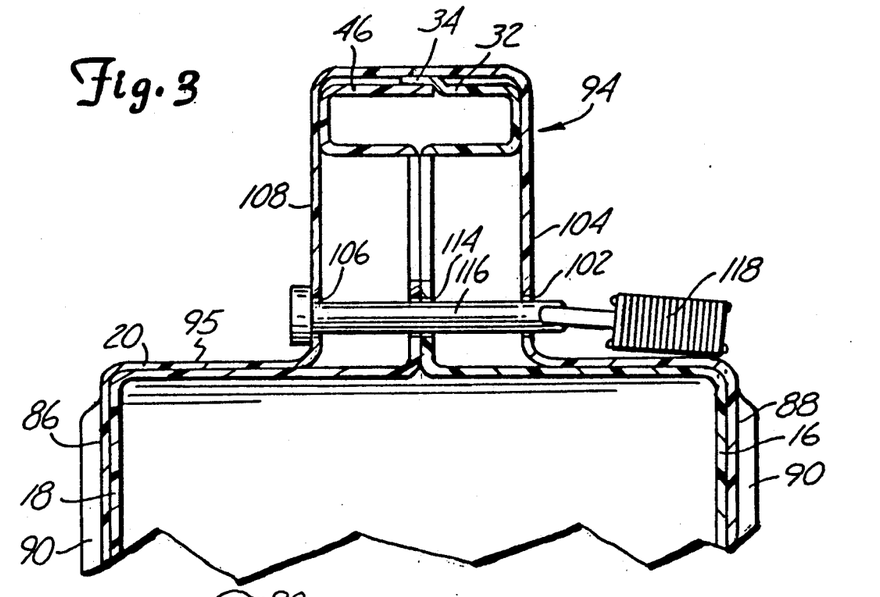
FIG. 3 shows a sectional view taken along the line 3—3 of FIG. 2.

A handle cap, 94, shown in FIG. 4, protrudes from a first side, 95, of end cap 20 and provides additional space in end cap 20 so that handle portion 32 of cover portion 16 and handle portion 46 of holder portion 18 can be received therein. Handle cap 94 has an end opening, 96, at a first end, 98, that is flush with first end 78 of end cap 20. A second end, 100, of handle cap 94 is acutely angled with respect to first side 95 of end cap 20 to minimize the air resistance of ski carrier 12 encountered in facing forward on a moving vehicle. End cap 20, including handle cap 94, is shown in FIG. 3 with case 14 inserted therein. Handle cap 94 has a cap containment side hole, 102, in a cap containment side surface, 104, and a cap support side hole, 106, in a cap support side surface, 108.

Second side 28 of cover portion 16 is attached to second side 42 of holder portion 18 by a hinge, 110, shown in FIG. 5. Hinge 110 can be a flexible membrane, integrally molded to both cover portion 16 and holder portion 18, a two-part metal hinge with parts screwed into cover portion 16 and holder portion 18, or another suitable type of hinge including one allowing detachment of these portions. Hinge 110 permits cover portion 16 to be positioned with respect to holder portion 18 such that case 14 may be varied between open and closed positions.

When case 14 is in a closed position, cover portion 16 covers holder portion 18 such that lip 34 extends over the edges of first side 40, end 44, and handle portion 46 of holder portion 18. Both strips 74 attached to cover major wall 24 come into contact with any skis 72 in slots 70 and hold those skis in place. In addition, handle portion 32 and handle portion 46 come together to form a single composite handle, 111, shown in FIG. 1.

If case 14 is in the open position, as shown in FIG. 5, the interiors of cover portion 16 and holder portion 18 are exposed. In this open position of case 14, skis 72 may be easily inserted therein or removed therefrom.

End opening 76 in end cap 20 and end opening 96 in handle cap 94 are large enough to permit a first end, 112, or open end, of case 14 to pass therethrough and into end cap 20 if case 14 is in the closed position. If case 14 is inserted a selected one of several predetermined distances into end cap 20, ridges 36 on cover portion 16 and ridges 50 on holder portion 18 will be nestled in corresponding recesses 92 in end cap 20, which, as stated above, aid in holding end cap 20 in place and aligned with case 14. Thus, ski carrier 12 can accommodate different lengths of the longest ski carried therein by selecting one of the discrete distances that first end 112 of case 14 can be inserted into end cap 20 through selecting which ridges 36,50 will be nestled in recesses 92.

Figure 2:
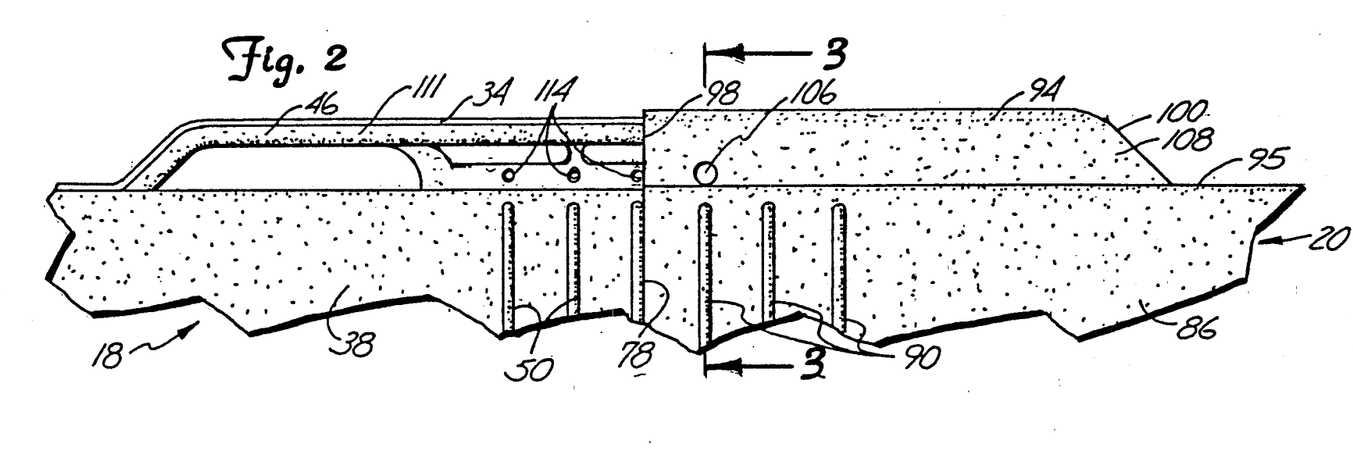
FIG. 2 shows a bottom view of a part of the ski carrier in FIG. 1.

Handle 111, shown in FIG. 2, has a plurality of locking holes, 114, therein spaced along the direction of elongation of cover and holder portions 16 and 18 such that one locking hole 114 will automatically align with cap containment side hole 102 and cap support side hole 106 for each ridge-recess determined discrete distance that first end 112 of case 14 can be inserted into end cap 20. End cap 20 can thus be locked in place to case 14 by a bolt, 116, which is inserted through cap containment side hole 102, the selected locking hole 114, and cap support side hole 106. Bolt 116, having a hole therethrough perpendicular to its long direction axis at the end thereof opposite the head end, can be secured by a lock, 118, as shown in FIG. 3, by having the shackle of lock 118 inserted through the bolt hole. Once end cap 20 is over first end 112 of case 14 and secured thereto, cover portion 16 and holder portion 18 are prevented from opening significantly with respect to each other. Therefore, case 14 will remain closed against accidental opening or intrusion.

Each strap assembly 22 is shown in FIG. 5 and comprises a nylon (or woven metal) strap, 120, two metal hooks, 122, and a tightening buckle, 124, which may be kept within case 14 during airplane or manual transport. To mount ski carrier 12 on a vehicle 10, an end of each strap 120 with its hook 122 is inserted through a corresponding opening 48 in first side 40 of holder portion 18, and the remaining end is inserted through the opposite corresponding opening 48 in second side 42 of holder portion 18. Ski carrier 12 can be placed on vehicle 10 such that case 14 is supported thereon by supports 52 and pads 54. First end 112, or the open end, of case 14 can be oriented such that it is facing forward. Each hook 122 can then be taken from where it emerges from its corresponding opening 48 and extended to hook to a suitable portion of vehicle 10, such as a rain gutter or door frame. Strap 120, tightened using tightening buckle 124, secures each hook 122, and therefore case 14, to vehicle 10. Case 14 can then be closed by closing cover portion 16 against holder portion 18, and end cap 20 can be slid over first end 112 of case 14. End cap 20 is then secured to case 14 using bolt 116.

To remove ski carrier 12, so attached, from vehicle 10, end cap 20 is removed from case 14. Case 14 is then opened and strap 120 loosened. All hooks 122 can then be unhooked from vehicle 10 and ski carrier 12 can be removed.

Figure 8:
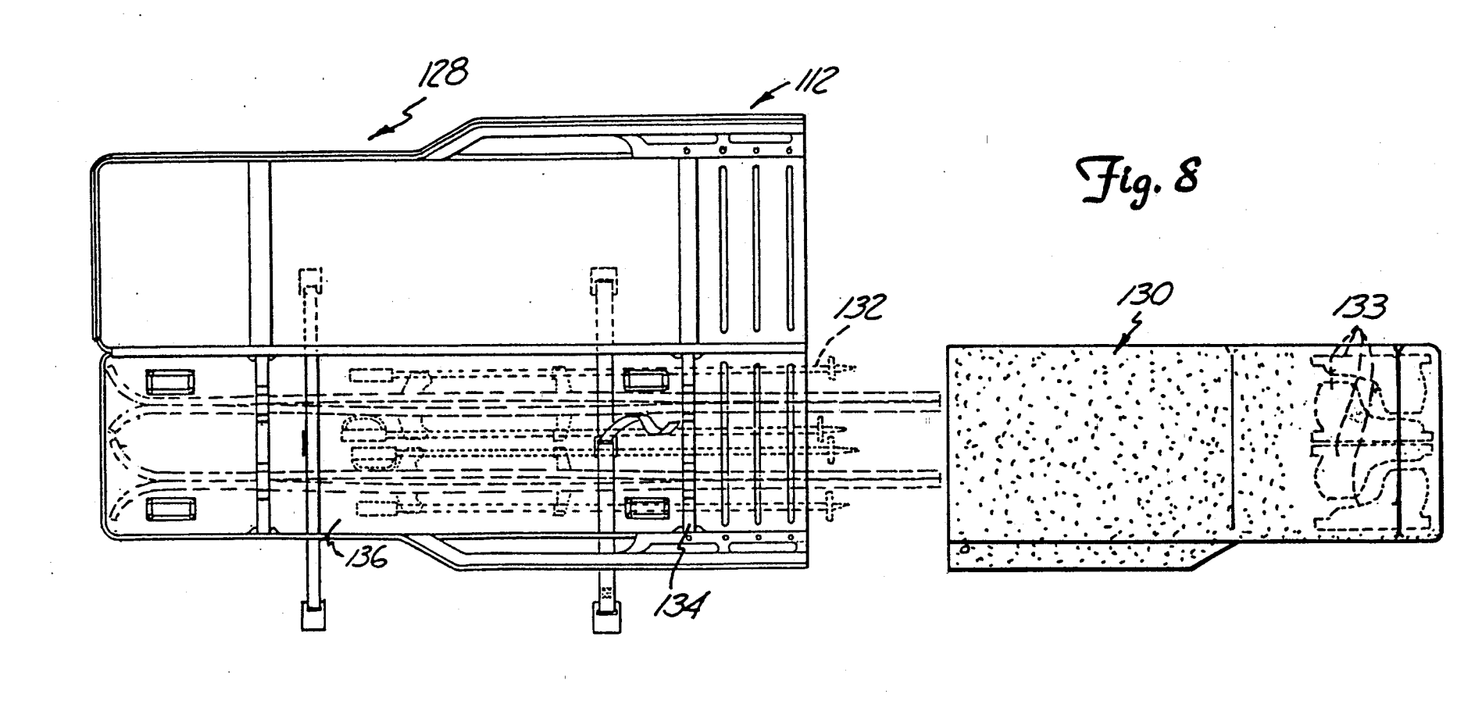
FIG. 8 shows a top view of the end cap portion and the case portion of an alternative embodiment of the present invention with the case portion in the open position.

In a first alternative embodiment, ski carrier 12 is similar to that described above except that the dimensions of a case, 128, and an end cap, 130, are enlarged to permit ski carrier 12 to hold more equipment, including a number of ski poles, 132, and ski boots, 133. A metal bracket, 134, attached to holder portion, 136, of case 128 is adapted to hold ski poles 132. First end 112 of case 128 is inserted into end cap 130 in the same manner as described above.

Although the present invention has been described with reference to preferred embodiments, workers skilled in the art will recognize that changes may be made in form and detail without departing from the spirit and scope of the invention.

What is claimed is:

1. A ski carrier to hold skis for being alternatively transported by carrying and by vehicular mounting, said ski carrier comprising:

an openable case means comprising a cover portion and a holder portion, said cover portion being positionable with respect to said holder portion to thereby permit closing of said case means about an interior space formed therein and to permit opening of said case means to expose said case interior space, said case means having a case opening therein at a case first end to provide access to said case interior space when said cover portion and said holder portion are in a closed position and being elongated along an axis therein passing through said case opening;

an end cap means having a cap first end of substantially rigid unitary construction with a cap opening therein to provide access to a cap interior space and elongated along an axis therein passing through said cap opening, said cap opening having sufficient dimensions to permit said first end of said case means to pass therethrough and enter said cap interior space when said cover portion of said case means is positioned with respect to said holder portion of said case means to substantially close said case means so as to thereby maintain said cover portion and said holder portion in said closed position; and a securing means for securing said end cap means to said case means with said case first end extending a selected distance through said cap opening into said cap interior space.

2. The apparatus of claim 1 wherein said holder portion of said case means has a plurality of openings therein through which a fastening means can be inserted to extend to a vehicle to permit attaching said case means to that vehicle.

3. The apparatus of claim 1 wherein said fastening means comprises a first belt having a first end and a second end, a tightening means for tightening said first belt, and hooks on each of said first and second ends of said first belt.

4. The apparatus of claim 3 wherein said tightening means is located within said case interior space.

5. The apparatus of claim 1 wherein the distance that said case first end extends through said cap opening into said cap interior space is selectable.

6. The apparatus of claim 5 wherein said cover portion has a cover major outer surface having a plurality of cover ridges thereon at an angle to said case means axis of elongation, said holder portion has a holder major outer surface having a plurality of holder ridges thereon at an angle to said case means axis of elongation, and said end cap means has first and second cap major inner surfaces opposing one another wherein each second cap major surface has a plurality of elongated recesses therein in corresponding relation with said cover ridges and said holder ridges such that said recesses and said ridges can be nestled.

7. The apparatus of claim 6 wherein each of said recesses nestles a different one of said ridges for each selected distance that said case first end extends through said cap opening.

8. The apparatus of claim 1 wherein said cover and holder portions of said case means are joinable and at least partially separable such that said cover portion can be positioned with respect to said holder portion to alternatively enclose and expose said case interior space when free of said end cap.

9. The apparatus of claim 1 wherein said cover and holder portions of said case means are rotatably attached such that said cover portion can be positioned with respect to said holder portion to alternatively enclose and expose said case interior space when free of said end cap.

10. The apparatus of claim 9 wherein said cover and holder portions of said case means are detachable.

11. The apparatus of claim 1 wherein said end cap mans has a pair of cap locking holes therein and said case means has a plurality of case locking holes therein that can be aligned with said cap locking holes when said case means is closed with said first end thereof in said cap interior space, and said securing means comprises an object capable of being inserted through said aligned cap and case locking holes.

12. The apparatus of claim 11 wherein said case locking holes are positioned such that one of said case locking holes aligns with said cap locking holes for each selected distance that said case first end extends through said cap opening.

13. The apparatus of claim 1 wherein a first cap major outer surface and a holder major outer surface have a plurality of outwardly extending protrusions thereon for supporting said ski carrier.

14. The apparatus of claim 13 wherein each of said outward extending protrusions has a drainage hole therein.

15. The apparatus of claim 1 wherein said cover portion has a cover major inner surface having a cushioned insert mounted thereon for holding said skis in place.

16. The apparatus of claim 1 wherein said holder portion has a holder major inner surface having a holding means mounted thereon for holding said skis in place.

* * * * *

UNITED STATES PATENT AND TRADEMARK OFFICE
CERTIFICATE OF CORRECTION

PATENT NO. : 5,285,942

DATED : February 15, 1994

INVENTOR(S) : JAMES H. WILLS

It is certified that error appears in the above-identified patent and that said Letters Patent is hereby corrected as shown below:

Col. 6, line 51, delete "claim 1", insert --claim 2--

Signed and Sealed this

Twenty-third Day of August, 1994

Attest:

BRUCE LEHMAN

*Attesting Officer*    *Commissioner of Patents and Trademarks*